United States Patent [19]

Persson

[11] 3,948,291
[45] Apr. 6, 1976

[54] STIFFENING DEVICE
[75] Inventor: Holger Alexis Persson, Enkoping, Sweden
[73] Assignee: AB Bahco Ventilation, Sweden
[22] Filed: May 17, 1974
[21] Appl. No.: 470,855

[30] Foreign Application Priority Data
June 6, 1973 Sweden............................ 7307988-1

[52] U.S. Cl. ................... 138/103; 52/734; 138/108; 138/178; 248/75
[51] Int. Cl.² ........................................... F16L 3/00
[58] Field of Search ........... 138/103, 108, 118, 172, 138/178; 248/75; 52/108, 734

[56] References Cited
UNITED STATES PATENTS

| 147,446 | 2/1874 | Stilwell | 138/172 |
|---|---|---|---|
| 1,471,207 | 10/1923 | Riddle | 138/172 X |
| 2,327,347 | 8/1943 | Gibbin | 138/172 X |
| 3,402,741 | 9/1968 | Yurdin | 138/118 |
| 3,889,717 | 6/1975 | Obadal et al. | 138/178 X |

Primary Examiner—Richard C. Queisser
Assistant Examiner—Charles Gorenstein
Attorney, Agent, or Firm—Stevens, Davis, Miller & Mosher

[57] ABSTRACT

A stiffening device for filter hoses of square crosssection includes two substantially identically shaped wires or strips. Each wire or strip is bent along a single plane repeatedly substantially at right angles to each other to form a zig-zag configuration having alternate longitudinally and transversely extending portions. The length of each of the transversely extending portions correspond to the diagnonal measurement of the hose. The two wires or strips are connected with each other at the centre points of the transversely extending portions and at right angles to the individual plane of those portions.

3 Claims, 1 Drawing Figure

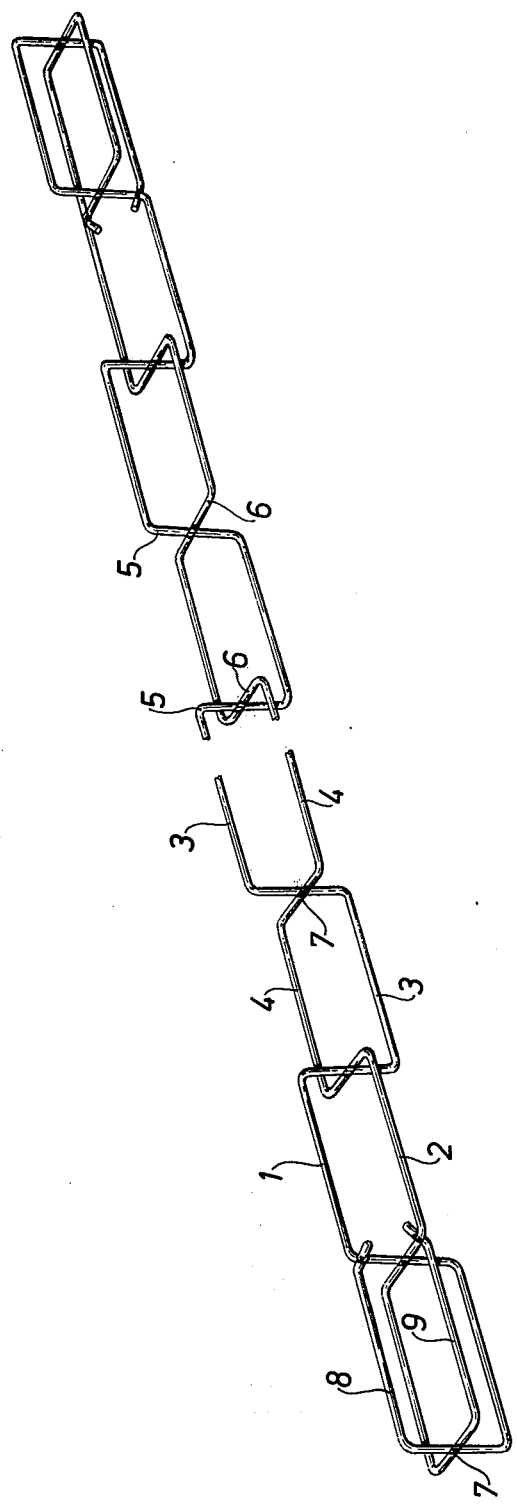

STIFFENING DEVICE

The present invention relates to stiffening devices for tubular, non-self supporting objects, and in particular for filter hoses of square cross section which are joined at two diagonally opposed corners to similar hoses, to form a continuous row of such hoses.

The stiffening device of the present invention can be readily produced in a relatively inexpensive manner and is solely comprised of two identical elements which, when the device is in place in a hose of the aforementioned type, will reliably stiffen the hose along the whole of its length. With the device of the present invention, the hose is supported along the major portion of its length solely by stay wires located in two adjacent corners of the hose while the two remaining corners are free. This is an advantage when the hose is being blown clean (shape changing).

The stiffening device of the present invention is mainly characterized in that it comprises two identically shaped wires or strips which along a single plane are bent regularly substantially at right angles to each other to form a zig-zag configuration having alternate longitudinally extending and transversally extending portions, of which portions the transverse portions have a length corresponding to the diagonal measurement of the hose, wherein the two wires are connected together at the centre points of the transversally extending portions and at right angles to the individual planes of said wires.

In order to avoid sharp end portions and to increase the rigidity of the stiffening device, it is convenient to give each end of the wires a rectangular loop-shaped configuration, by bending the end of the wire back along itself and joining said end to said wire, as illustrated in the drawing.

The transversally extending portions of the two wires may be joined together as by welding, preferably as by spot welding, although rivits or nuts and bolts may be used, it being possible in this latter instance to vary the angle between the two wires and to turn the wires so that they lay flat against each other, thereby facilitating storage of the same.

The wires are preferably made of a suitable metal or metal alloy, although other materials such as plastics or glass may be used.

So that the invention will be readily understood and other features thereof made apparent, a stiffening device according to the invention will now be described with reference to the single drawing forming part of this specification.

In the drawing the two wires are identified by the reference numerals 1 and 2, while references 3 and 4 identify the longitudinal extending portion of the wires, and 5 and 6 the transversally extending portion of said wires. The points at which the wires are joined together are shown at 7 and the rearwardly bent end portions of the wires are shown with references 8 and 9. As will be understood from the drawing, the hose-like object to be stiffened by the stiffening member will be given a square cross sectional shape at the portions thereof where the transversally extending portions 5 and 6 intersect each other at right angles, the diagonals of the hose of square cross section having the same length as the transversally extending wires portions of the stiffening member. When the transversally extending portions intersect each other at an oblique angle other than 90° a rhombic cross-sectional shape will, of course, be obtained.

I claim:

1. A stiffening device for filter hoses of square cross-section and joined at two diagonally opposed corners thereof with other, similar hoses to form a continuous row of such hoses, said stiffening device comprising two substantially identically shaped wires or strips, each of which is bent along a single plane repeatedly substantially at right angles to form a zig-zag configuration having alternate longitudinally and transversally extending portions, of which portions the latter have a length corresponding to the diagonal measurement of the hose, the two wires or strips being connected with each other at the centre points of the transversally extending portions and at right angles to the individual planes of said portions.

2. A stiffening device according to claim 1, characterized in that each wire is provided at each end thereof with a rectangular loop-shaped portion.

3. A stiffening device according to claim 2, wherein said loop-shaped portions comprise the end portions of respective wires which are bent rearwardly to extend parallel with said longitudinally extending portions of said respective wires at points along the lengths thereof.

* * * * *